United States Patent [19]

Bilkadi et al.

[11] Patent Number: 5,307,438
[45] Date of Patent: Apr. 26, 1994

[54] INDEX MATCHING COMPOSITIONS WITH IMPROVED DNG/DT

[75] Inventors: Zayn Bilkadi, Mahtomedi; Marc D. Radcliffe, Woodbury; Novack James C., St. Paul, all of Minn.

[73] Assignee: Minnesota Mining and Manufacturing Company, Saint Paul, Minn.

[21] Appl. No.: 929,091

[22] Filed: Aug. 13, 1992

[51] Int. Cl.$^5$ ................................. G02B 6/00
[52] U.S. Cl. ..................... 385/141; 385/15; 385/73; 385/95
[58] Field of Search ........... 385/15, 27, 31, 51, 385/73, 76, 95, 97, 98, 115, 121, 137, 139, 143, 145, 4, 141; 359/228, 665

[56] References Cited

U.S. PATENT DOCUMENTS

| | | | |
|---|---|---|---|
| 3,996,187 | 12/1976 | Travnicek | 523/107 |
| 3,996,189 | 12/1976 | Travnicek | 523/107 |
| 4,008,198 | 2/1977 | Krohberger et al. | 260/37 SB |
| 4,418,165 | 11/1983 | Polmanteer et al. | 523/210 |
| 4,448,483 | 5/1984 | Ryley, Jr. | 385/68 |
| 4,714,829 | 12/1987 | Hartog et al. | 250/227.14 |
| 4,729,619 | 3/1988 | Blomgren | 385/70 |
| 4,784,456 | 11/1988 | Smith | 385/55 |
| 4,818,055 | 4/1989 | Patterson | 385/98 |
| 4,824,197 | 4/1989 | Patterson | 385/137 |
| 4,851,270 | 7/1989 | Che et al. | 428/1 |
| 4,856,865 | 8/1989 | Lee | 385/67 |
| 4,865,412 | 9/1989 | Patterson | 385/71 |
| 4,898,755 | 2/1990 | Che et al. | 427/389.7 |
| 4,958,919 | 9/1990 | Sigler | 359/819 |
| 4,991,929 | 2/1991 | Bowen et al. | 385/50 |
| 5,013,123 | 5/1991 | Patterson | 385/98 |
| 5,073,831 | 12/1991 | Flint | 359/845 |
| 5,108,200 | 4/1992 | Nonaka et al. | 385/16 |

OTHER PUBLICATIONS

R. K. Iler, The Chemistry of Silica, John Wiley and Sons, 1979, p. 464.
C. Jeffrey Brinker et al. (editors), Materials Research Society Symposia Processings, "Better Ceramics Through Chemistry", Symposium held in Alburquerque, New Mexico, 1984, vol. 32, North Holland Publisher, p. 9.
NYE Specialty Lubricants, trade description of NYE Nyogel OC-431A Optical Couplant (no date available).

*Primary Examiner*—Frank Gonzalez
*Attorney, Agent, or Firm*—Gary L. Griswold; Walter N. Kirn; Mark A. Litman

[57] ABSTRACT

The invention relates to optically transmissive, silica-containing compositions which exhibit a small change of refractive index with respect to temperature changes ($dn_g/dT$). The compositions are derived from silica sols dispersed in liquid organic polymers. The invention relates to optical systems comprising a plurality of elements that are optically interconnected by means of the inventive composition. An especially preferred embodiment of the invention is the use of the composition within a connector to simultaneously align and join optical fibers.

32 Claims, No Drawings

5,307,438

INDEX MATCHING COMPOSITIONS WITH IMPROVED DNG/DT

BACKGROUND OF THE INVENTION

1. Field of the Invention

The invention relates to optically transmissive silica-containing compositions which exhibit a small change of refractive index with respect to changes in temperature, $dn_g/dT$. The gels are derived from silica sols dispersed in liquid organic polymers. The invention also relates to optical systems comprising a plurality of elements that are optically coupled by means of the inventive composition. An especially preferred embodiment of the invention is use of the composition in optical fiber splices and/or connectors to simultaneously align and join optical fibers.

2. Background of the Art

A persistent problem relating to prior art refractive index matching materials (IMM) used to optically connect optical elements such as optical fibers and waveguides is the sizable change in refractive index that results from changes in ambient temperature $dn_g/dT$—a value that is also referred to as the temperature coefficient of the refractive index. The change in refractive index causes a variety of problems well known to those schooled in the art, which are further aggravated by the accompanying thermal expansion or contraction of the IMM, the connectors, and the splices forming the interconnections. It is usually the case that the coefficient of thermal expansion is larger in the IMM than in the joined optical elements. Index matching compositions (IMC) as described within the context of this invention are mixtures of two or more materials, often gels, that are used primarily in splices for simultaneously aligning and joining optical fibers or waveguides.

Prior art IMCs tend to consist of liquids (often silicone oils) containing a low concentration of hydrophobic fumed silica. The silica acts as a thixotropic agent to prevent material flow. The gel, having a typical viscosity in the range 1.5-2.0 kPascal-second at 25° C., is filtered to remove particles of size greater than 200 nanometers which would scatter light. At the concentrations used (about 10% by weight), the fumed silica provides no significant reduction in $dn_g/dT$, where $n_g$ is the refractive index of the IMC. For these conventional silicone based IMCs, $dn_g/dT$ is usually in the range of $-3.3$ to $-3.7 \times 10^{-4}/°C$. For optical fibers made of silica glass, $dn_f/dT$, is typically of the order of $-10^{-6}/°C$., where $n_f$ is the refractive index of the fiber. The state of the art at present requires IMCs with $dn_g/dT$ smaller in magnitude than $-3.3 \times 10^{-4}/°C$., as reduction of this value would result in improved signal transmission and reduced reflective losses through the splice over the desired range of operating temperatures. A large number of patents refer to the use of specific index matching materials such as index matching fluids, gels, adhesives, cements, and films in fiber optic connectors. Of interest are U.S. Pat. Nos. 5,013,123; 4,991,929; 4,856,865; 4,784,456; 4,729,619; and 4,448,483.

U.S. Pat. No. 5,013,123 describes stamped precision lightguide interconnect centering elements made from deformable metals (e.g., aluminum) or polymers that can be formed to define three surfaces that align and clamp the ends of two optical fibers, forming a butt splice therebetween. The text at column 6, lines 21 through 25, describes the use of a gel which has index of refraction matching characteristics similar to the fiber core to improve the continuity of the transmission through the splice. The position of the gel is shown in FIG. 13, ref. numeral 100.

The addition of particulate silica as a reinforcing agent to improve the mechanical properties of silicone polymers is well known in the art. For example U.S. Pat. Nos. 3,996,187 and 3,996,189 (both to Travnicek) describe fumed silica reinforced silicones which have utility in making contact lenses when the silica level is kept between 5 and 20% by weight. Such levels of fumed silica are too low to have an appreciable effect on the temperature dependence of the refractive index. Fumed silica (also called pyrogenic silica) is a colloidal silica powder usually made by condensing silica from a vapor phase at elevated temperatures. The colloidal particles in fumed silica are not electrostatically charged and are therefore clustered into large aggregates. See *The Chemistry of Silica* by R. K. Iler, 1979, p.464, John Wiley and Sons for greater detail on this material.

U.S. Pat. No. 4,008,198 (Krohberger et al.) teaches that sheets of highly transparent reinforced elastomers with improved tear strength can be obtained by mixing (1) a nitrogen compound containing at least one triorganosilyl group of a particular type, (2) a hexaorganodisilazane, (3) silicon dioxide having a surface area of at least 50 m$^2$/g and (4) a polydiorganosiloxane of viscosity higher than 500,000 cS, and kneading the mixture at 150° C. under vacuum until there is no evidence that nitrogen compounds are being evolved.

U.S. Pat. No. 4,418,165 (Polmanteer et al.) describes silicone compositions with improved tensile strength comprising a hydrophobized "reinforcing" silica gel obtained by the alkaline hydrolysis in ammonium hydroxide of a mixture of tetraalkyl orthosilicate (tetraalkoxy silanes) and a hydrophobizing agent. The silica gel is laboriously milled or high shear mixed with a silicone gum to breakup large agglomerates into smaller aggregates. We have found that when mixed with fluids, this form of silica hydrogel yields highly rigid, embrittled composites with inferior luminous transmission when the silica level exceeds 20% by weight.

U.S. Pat. Nos. 4,898,755 and 4,851,270 describe optically clear inorganic-organic compositions prepared from porous monoliths of hydrolyzed alkoxy silanes and organic compounds exhibiting nonlinear optical responses.

An ideal index matching composition would possess the following four optical characteristics: 1) It would be 100% transmissive at the wavelengths of light employed, 2) Its refractive index would be the same as (i.e matched to) that of the optical element (e.g., a fiber) at this wavelength, 3) The refractive index of the optical element and the IMC would possess the same temperature dependency (i.e., the same change in indices of refraction for the same temperature changes) and 4) The refractive index of the optical element and the IMC would possess the same wavelength dependency.

In reality such an ideal IMC is presently unattainable. 100% transmissivity is virtually impossible to achieve due to light scattering caused by particle aggregation in the gel and/or the mismatch between the refractive indices of the colloidal particles in the IMC and the dispersing polymer phase. In addition, although the refractive indices of the IMC and the optical element may exactly match at one temperature, they cannot be made identical over a working temperature range because the temperature and wavelength dependence of the refractive index of the optical element has been found to be different from the temperature and wavelength dependence of the refractive index of the IMC.

In addition to its optical characteristics, the viscosity of the IMC is important The index matching gel must possess viscosity characteristics that allow it to flow through small orifices during the application of the IMC to the splice element and to wet the surfaces to be connected. This viscosity requirement therefore virtually precludes the use of fumed silica or silica gels at levels much higher than 10% by weight because both of these forms of colloidal silica are extremely efficient thickening agents that would hinder both the prefiltration of the IMC and its application to the connector device.

Prior art IMMs have not sufficiently satisfied all of the above desirable characteristics simultaneously. In particular, a persistent problem relating to IMMs of the prior art is the sizeable change in the materials properties resulting from changes in ambient temperature, i.e. the refractive index, the viscosity, and dimensional changes.

No prior art is known which discloses the beneficial effect of high concentrations of finely dispersed small particle silicas for reducing $dn_g/dT$ in refractive index matching compositions while maintaining the required low viscosity and high level of light transmissivity.

SUMMARY OF THE INVENTION

The present invention substantially reduces problems associated with temperature variations in optical connecting materials by providing a new index matching composition containing proportions of finely divided silicas that are much higher than heretofore allowed when adding fumed silica. A significant advantage over the prior art of the new compositions of the present invention is that the new IMCs have a small change of refractive index with respect to temperature $dn_g/dT$. Surprisingly, although the new compositions comprise levels of dispersed silica that are much higher than those in the prior art, their viscosity is much lower than that of gels of the prior art, giving them superior flow and wetting properties. A further advantage of the invention is that the high concentration of silica in the IMC results in a closer match between the change of the index of refraction with respect to wavelength $(dn_g/d\lambda)$ of the IMC and that of the optical fiber $(dn_f/d\lambda)$ which further reduces losses at fiber-IMC interfaces, especially when the transmitted optical signal is polychromatic.

A preferred embodiment of the invention is an optically transmissive gel comprising:

i) twenty to eighty parts by weight individually dispersed silica sol particles, ii) eighty to twenty parts by weight of a liquid polymer or copolymer having a refractive index between 1.44–1.52, and iii) an effective amount of a coupling agent (such coupling agents include organosilicon (silane) coupling agents and their equivalents in the coupling art). The gel may be anhydrous (i.e., less than 0.5% by weight of water).

The invention extends to processes for making the low $dn_g/dT$ gel and to systems for the transmission of optical signals or optically encoded information, said systems comprising one or more elements that are optically interconnected by means of the IMC of the present invention. In such systems the refractive indices of the gel and optical elements are substantially matched to reduce scattering and reflective losses at all temperatures within the proposed range of operating temperatures. An especially preferred embodiment of the invention is use of the IMC in splice connectors that simultaneously align and clamp optical fibers The inventive composition can provide at least the following benefits: Low reflection losses over a wide range of temperatures because the mismatch in refractive index at the interface between elements is minimized; a wide range of operating temperatures can be accommodated, because the IMC has a small change of refractive index with respect to temperature changes; a low coefficient of thermal expansion; and a wider range of optical wavelengths can be accommodated because the IMC has a small wavelength dispersion; improved flow and wetting properties because the inventive IMC viscosity is lower than those of the prior art; a wide range of refractive indices in the optical elements to be joined can be accommodated because the IMC can be formulated to yield a wide range of refractive indices.

FOR THE PURPOSES OF THIS INVENTION

An "index matching composition" comprises mixtures of two or more materials with an index of refraction of between 1.44 and 1.52 for the composition.

An "index matching material" may be single pure material such as a silicone fluid or a mixture of two or more materials having a refractive index between 1.44 and 1.52.

"individually dispersed silica sol particles" are non-aggregated, fully dense silica particles having an equivalent sphere mean diameter of from 10 to 50 nanometers.

"fully dense silica particles" are particles that have a fractal number of at least 3.0 as measured by small angle X-ray scattering. By comparison, porous silica particles, or aggregated silica particles such as in silica gel are known to have fractal numbers less than 3.0 (see "Better Ceramics Through Chemistry", Ed. Brinker et al., North Holland, p. 9 (1984)).

An "optically transmissive composition" is a composition that has a luminous transmission of at least 90% as determined by ASTM D1003-61 When measured on a uniform 1 centimeter thick sample of the gel, and greater than or equal to 95% when measured on a 254 micrometer thick sample. The haze must be less than 3% on a 254 micrometer thick sample as measured by the same method.

A "compatible liquid" is a liquid that does not cause flocculation or phase separation in the silica sol.

A "silica organosol" is a silica sol dispersion wherein the liquid phase is a fluid having a chemical composition containing the element carbon.

DETAILED DESCRIPTION OF THE INVENTION

Optical fiber splices, connections, and terminations require fiber cleavage as part of the process of preparing optical circuits. The resulting air gap that exists at fiber ends upon installation of a splice or connector is the source of reflections at the glass-air and air-glass interface. These reflections (e.g., back reflections) may cause problems with signal loss, same-wavelength duplex transmission, and the use of single-longitudinal mode lasers. Such problems are greatly reduced by using index matching materials which have refractive indices equal to that of the fibers joined. However, these materials must have a ($dn_g/dT$) that is as small as possible to match that of the connected optical elements.

The inventive IMC comprises a silica sol in an organic polymer, preferably a liquid or polymer solution, with the silica surface being optionally silane modified. The silica concentration is from 10 to 80%, preferably from 20 to 65%. These modified silica sol particles have substantially smaller average diameters than the fumed silica particles used in prior art IMCs, which are normally aggregated into large clusters (as is shown for example in "The Chemistry of Silica", R. Iler, John Wiley & Sons, p. 365 (1979)). The high level of silica sol loading in the gel reduces the temperature coefficient of the refractive index, while the small particle size and refractive index match between sol and the organic polymer maintains the optical clarity of the IMC. The high sol content of the inventive IMC does not degrade beneficial properties of the organic polymer such as its wetting capability and its substantially linear viscosity coefficient over a wide range of shear rates. In fact, at higher silica loadings, the viscosity of the inventive IMC is many orders of magnitude lower than that of the prior art IMCs containing fumed silica.

The rheology of the inventive compositions depends on the nature of the components, such as for example, the structure of the individually dispersed silica sol particles, the molecular weight of the liquid polymers, and the interaction between the sol and liquid polymer. However, in general, the low $dn_g/dT$ composition is substantially a Newtonian liquid at low sol concentrations of about 20 percent by weight. As the sol concentration is increased the composition develops a yield stress and behaves as a Bingham plastic. The yield stress increases with increasing sol concentration and the compositions become gels at the high end of the concentration range, i.e., when the sol concentration exceeds about 60%.

In addition to a close match between the refractive index of the coupled elements, the IMC itself must, as a second requirement, be as free as possible of light scattering centers that cause turbidity (or haze) which would lead to losses in the transmitted optical signal. In order to assure the optical transparency of the IMC, it is important to incorporate the silica particles into the liquid polymer matrix in a manner that minimizes light scattering (or haze).

One of the major causes of haze, or light scattering, in silica-containing polymers is the large size of the dispersed particles. It is well known from light scattering theory that when the particles dispersed in a polymer attain an average diameter of the same order of magnitude as the wavelength of light (usually within ¼ of the wavelength of the light), intense light scattering (and therefore haze) ensues. To maintain good transparency, the dispersed silica particles must therefore have dimensions that are substantially smaller than the wavelength of light being transmitted. Thus if the light being transmitted is visible light of wavelength 500 nanometers, the dispersed silica particles must have an average particle size substantially smaller than 500 nanometers. Preferably the range of particle sizes in the silica sol should be from 10 to 100 nanometers, more preferably from 10 to 50 nanometers.

In silica sols, in contrast to fumed silica or silica derived from the hydrolysis of tetraalkyl orthosilicate, the silica particles are not aggregated or part of a network, but are individually dispersed in a liquid medium, often water or a water-alcohol mixture, with each particle of silica being electrostatically negatively charged. It is the double layer developed by this electric charge on each particle that accounts for non-aggregation of the silica sol by virtue of electrostatic repulsion forces. In the case of silica sols where the liquid medium is an organic liquid, the individually dispersed silica particles may still be electrostatically charged, but the main stabilizing factor of the sol is steric hindrance whereby each particle of silica is kept separated from its immediate neighbors by a strongly adsorbed layer of organic molecules called the "steric layer". Therefore by virtue of their available sizes from 10 to 100 nanometers and stability, silica sols are preferred over fumed silica or silica gels in the preparation of optically transmissive IMCs. In addition to superior optical transmissivity, IMCs derived from silica sols do not require the cumbersome and expensive mechanical milling process step to break down aggregation. Also silica sol-filled IMCs exhibit significantly lower viscosities than gels made with fumed silica or silica derived from the hydrolysis of tetraalkyl orthosilicates.

In the practice of this invention, both aqueous silica sols and non-aqueous silica sols (also called silica organosols) may be used to prepare IMCs.

Examples of aqueous silica sols are the alkaline or acidic silica sols known under the trade name Ludox TM (Du Pont), Nalco TM (Nalco Co.) and Nyacol TM (Nyacol Co.). Particularly preferred are the silica sols in anhydrous organic liquid media such as lower aliphatic alcohols, toluene, ethylene glycol, dimethylacetamide, formamide, and the like.

Commercially available non-aqueous silica sols that may be used in the practice of this invention include Nalco 1057, and Nissan's silica organosols trademarked MA-ST, IPA-ST, EG-ST, NPC-ST, DMAC-ST, EG-ST-L1, EG-ST-L5 and the like. In the practice of this invention, the silica sol is chosen so that its liquid phase is compatible with the polymer in the IMC. Thus, if the polymer of the IMC is water or alcohol soluble, the silica sol should preferably be an aqueous silica sol of appropriate pH or an alcohol-based silica organosol.

It is found in this invention that $dn_g/dT$ is substantially reduced if high proportions of finely divided silica particles of appropriate refractive index are incorporated into a polymer phase. To understand the physical basis of this new property, the Gladstone-Dale relation for the refractive index will be used (Polymer Handbook, J. Brandrup and E. H. Immergut, 3rd Edition, VI-452). The Gladstone-Dale relation applies to heterogeneous compositions whose constituent refractive indices differ by less than 0.2, which is the case in this invention. The refractive index of the inventive IMC under this condition is given by the relation:

$$n_g = (1-F)n_p + Fn_s \tag{1}$$

where $n_p$ is the refractive index of the pure polymer, $n_s$ the refractive index of the dispersed silica and F the volume fraction of silica in the composition, therefore:

$$dn_g/dT = (1-F)dn_p/dT + F\,dn_s/dT \tag{2}$$

For pure polymers $dn_p/dT$ is of the order of $-3.5 \times 10^{-4}/°C$. (see The Handbook of Plastic Optics, 2nd Edition, U.S. Precision Lens Inc., p. 18), whereas for amorphous silica $dn_s/dT$ is $-5 \times 10^{-6}/°C$. Thus, for all practical purposes, the second term on the right hand side of equation (2) may be neglected, which leads to the simplified relationship:

$$(dn_g/dT)/(dn_p/dT) = 1-F \qquad (3)$$

This relationship shows that $dn_g/dT$ for an IMC comprising an organic polymer phase p and dispersed amorphous silica phase s, is always smaller than $dn_p/dT$ for the pure polymer. Moreover, the higher the concentration (more specifically volume fraction F) of silica in the IMC, the smaller is the magnitude of $dn_g/dT$. To achieve substantial lowering in the magnitude of $dn_g/dT$ the silica concentration must be larger than 20% by weight of composition, preferably from 40 to 80% by weight of composition.

The other component of the inventive IMC is an optically clear organic polymer having a refractive index substantially matched to the refractive index of the coupled optical elements. For optical fibers or waveguides made of silica, the refractive index is in the range 1.44-1.52 depending on the mode of fabrication of the glass. This dictates that the refractive index of the organic polymer be in the same range. Many organic polymers that meet this refractive index requirement are listed in the "Polymer Handbook" 3rd Edition, p. VI-454.

Of particular interest to this invention are the liquid polymers and copolymers comprising the polyether polyols and end-substituted polyether polyols having a refractive index in the range 1.44-1.52 and the general structure I:

$$R^1-[OR^2-OR^3]_n R^4 \qquad (I)$$

Where
R$^1$ is H or an alkyl group or radical containing 1 to 12 carbon atoms, or R$^5$NHC$_y$H$_{2y}$ where R$^5$ is H or methyl and y=1 to 10, or C$_6$H$_5$NHCO.

R$^4$ is H or an alkyl group or radical containing 1 to 12 carbon atoms, or a halogen atom, or R$^5$NHC$_y$H$_{2y}$, or OR$^6$ where R$^6$ is either an alkyl radical containing 1 to 12 carbon atoms or C$_6$H$_5$NHCO.

R$^2$ is a divalent aliphatic group containing 1 to 5 carbon atoms.

R$^3$ is a divalent aliphatic group of 1 to 5 carbon atoms that may be identical to R$^2$, or CH(C$_x$H$_{2x+1}$)CO where x=1 to 3.

n is an integer from 1 to 50.

Examples of polymeric liquids that satisfy structure (I) are polymethylene glycol, polyethylene glycol, polypropylene glycol, polyisopropylene glycol, poly(oxyethylene-oxypropylene)glycol, poly(oxymethylene)dimethyl ether, poly(oxypropylene)dipropyl ether, poly(oxyethylene)dipropyl amines, poly(oxypropylene)monoethyl ether, and the like.

Because of their superior optical transparency, their hydrophobicity, temperature stability and chemical inertness, silicone polymers and copolymers are particularly preferred in the practice of this invention. Examples of such silicones are the polydimethyl and polydiphenyl siloxanes, the copolymers of dimethyl and diphenyl siloxanes, the copolymers of dimethyl and methylphenyl siloxanes, and the functionalized silicone polymers and copolymers such as vinyl terminated polydimethyl siloxanes, vinyl terminated poly(dimethyl diphenyl)siloxanes, vinyl terminated poly(diphenyl methylphenyl)siloxanes, and the like. Especially preferred are the silicone copolymers where the ratio of methyl to phenyl group containing monomers can be varied to provide refractive indices in the range from 1.44 to 1.52. The preferred silicone polymers have the following chemical formula:

$$(YR^3{}_2SiO)[(R^1{}_2SiO)_n(R^2{}_2SiO)_l(R^1R^2SiO)_m](R^3{}_2SiY) \qquad (II)$$

wherein:
R$^1$ is an alkyl group or radical having from 1 to 9 carbon atoms.

R$^2$ is an aryl group or radical or monohalogenated aryl group having from 6 to 18 carbon atoms.

R$^3$ is independently R$^1$ or R$^2$.

Y is H, or R$^1$, or CH$_2$=CH, or OH, or NH$_2$, or OR, or ROH, or RNHR', or RN(R')$_2$, R'NHCONR, or RCOOH, where R is methylene, ethylene or propylene and R' methyl, ethyl or propyl.

l, m, and n are positive integers whose values are independently chosen such that the resulting polymer is a liquid. l, m, & n are limited such that l, m, n are each greater or equal to zero, preferably at least one of l, m or n is at least 2, and preferably the sum of l plus m plus n is at least 2 and less than or equal to 2,000.

Another class of liquid polymers useful in this invention are the liquid siloxane-alkene oxide block copolymers obtained by copolymerizing the polymers represented by structures I and II. Representative examples of these copolymers are the poly(dimethyl phenylmethylsiloxane poly(ethylene oxide)copolymers, vinyl terminated poly(dimethyl phenylmethylsiloxane)-poly(ethylene oxide) copolymers, poly(dimethyl siloxane)-poly (ethylene oxide polypropylene oxide) copolymers and their vinyl terminated derivatives, and the like.

The inventors envision embodiments of the invention wherein the liquid polymers may comprise a composition capable of being further polymerized or crosslinked by means of heat or actinic radiation. Such compositions may contain monomers, oligomers, and higher molecular weight, liquid pre-polymers (including liquid silicone pre-polymers) having the required refractive index that have attached thereto vinyl, acrylate, epoxy, isocyanate, silane, hydrosilane, and other polymerizable functional groups well known to those skilled in the polymer art. Typically polymerizable compositions also contain initiators, catalysts, accelerators, sensitizers, and the like to facilitate the polymerization process.

The silica sol particles to be incorporated in the above liquid polymers and copolymers are optionally surface modified with silane (also called organosilicon) coupling agents to improve their dispersibility in the polymer matrix and, if required, to adjust the refractive index of the surface of the silica particles so that it substantially matches the refractive index of the polymer medium. Indeed, the degree of haze in the final IMC is not only dependent on the size of the dispersed silica particles (as mentioned above) but also on the difference (mismatch) between the refractive indices of the polymer phase and the silica phase.

Surface modifying, or coupling agents that can be used in the practice of this invention include, but are not limited to for example organosilanes, carboxylatochromium complexes, carboxylic acids, organotitanates, and organozirconates. Especially preferred surface modifying agents are the organosilanes, which include but are not limited to: phenyl trichlorosilane, phenyl triethoxy and trimethoxysilane, phenylethyl trichlorosilane, phenylethyl trimethoxy and triethoxysilane, phenylvinyl dichlorosilane, phenylvinyl dimethoxy and diethoxysilane, phenoxy trichlorosilane, phenoxy trimethoxy and triethoxysilane, phenylallyl dichlorosilane, phenylallyl dimethoxy and diethoxysilane, p-tolyltrichlorosilane, p-tolyltriethoxy and trimethoxysilane, vinyl trichlorosilane, vinyl trimethoxy and triethoxysilane, N-phenylaminopropyl trichlorosilane, N-phenylaminopropyl trimethoxy and triethoxysilane, methyl trichlorosilane, methyl trimethoxy and triethoxysilane, phenyl methyldichlorosilane, phenyl methyldimethoxy and diethoxysilane, methyl vinyldichlorosilane, methyl vinyldimethoxy and diethoxysilane.

An effective amount of a surface modifying agent is the amount needed to at least statistically enable or actually provide monolayer coverage of at least 75% (by number) or preferably 100% of the available surface area for each sol particle and therefore depends on the particle size (surface area) and concentration of silica in the composition. More surface modifying agent is required to achieve monolayer coverage of high surface area, small particle silicas used in higher concentrations. In practice, when a coupling agent is required, it is found that 0.01 to 0.1 mole silane coupling agent per 100g dry weight silica is sufficient to provide both improved dispersibility in the liquid polymer and improved refractive index match. Amounts of 0.01 to 0.5 mole silane per 100 g dry weight silica may be generally used.

Preferably the silane coupling agent is added to the silica sol as a dilute solution in an appropriate solvent such as a low boiling alcohol, a low boiling ketone, toluene, tetrahydrofuran, and the like. Once the silica sol and the silane solution are thoroughly mixed, a stoichiometric amount of water is added to hydrolyze all the alkoxy or chlorine radicals in the coupling agent. The required amount of organic polymer is then added and the resulting heterogeneous mixture is subjected to heat and/or vacuum to remove the volatile liquid phase from the organosol by an appropriate extraction technique such as rotary evaporation, thin film evaporation, simple distillation, azeotropic distillation or spray drying.

As described above, the process for making the low $dn_g/dT$ gel comprises the following steps:

a) providing a dispersion of silica sol particles in a first volatile liquid, b) optionally mixing into said dispersion an effective amount of a surface modifying agent to form a modified stable dispersion comprising individually dispersed, surface modified silica sol particles, c) mixing into said optionally modified dispersion a mutually compatible liquid polymer or polymer solution, comprising a polymer dissolved in a second volatile liquid, to form an organosol, d) optionally adding an excess of a third compatible volatile liquid medium to said organosol to form an azeotropic solution comprising said first, second and third volatile liquids, e) distilling said azeotropic solution to selectively remove said volatile components, and f) continuing said distillation to remove the excess of said third volatile liquid to form said refractive IMC.

The following variations are envisioned as falling within the scope of the inventive process: methods where the first and second volatile liquids are the same, and methods where the distillation steps further comprise vacuum distillation, rotary evaporative distillation, and thin film evaporation.

As mentioned hereinabove the low $dn_g/dT$ IMC of invention has utility in interconnecting a plurality of optical elements to form optical systems. These elements may be optionally coated with anti-reflection coatings, using coating materials and methods of the type well known in the art, to form optical systems. The types of optical elements envisioned by the inventors include, but are not limited to, optical fibers, waveguides, wavelength division multiplexers (WDMs), optical splitters/combiners, lenses, optical switches, prisms, mirrors, flat plates, liquid crystal displays, and the like.

These elements may be interconnected to form integrated optical systems in which there exist discontinuities in refractive index caused by a separation between elements which may have air or vacuum or another transparent medium between the elements. The refractive index discontinuity can be reduced or eliminated by filling such gaps or replacing the transparent medium with the inventive improved $dn_g/dT$ IMC.

The types of optical systems envisioned by the inventors include optical fiber systems generally, such as fiber optic communication systems, optical computers, fiber optic face plates. However, the inventive IMC has broader non-limiting utility in: microscopes, telescopes, interferometers, overhead projectors, traffic control devices, television screens, lens assemblies, micro-lens arrays, color filter assemblies, liquid crystal display assemblies, and integrated optical systems that do not contain optical fibers.

In yet another embodiment of the invention the low $dn_g/dT$ composition can be used to assemble an optical system having a low $dn_g/dT$ composition between component elements by providing a plurality of optical elements, such as those disclosed hereinabove, coating at least one of the elements with a layer of the low $dn_g/dT$ composition, joining the coated elements in the predetermined spatial arrangement. The constraining means envisioned are a crosslinked adhesive formed by crosslinking the liquid polymer component of the low $dn_g/dT$ composition by means of heat or actinic radiation, or applying external clamping means when the composition is non-adhesive. Non-limiting examples of such external clamping means are: optical fiber connectors and splices, lens and prism cell holders, wave guide assemblies, optical faceplates, microlens arrays, filter assemblies, and the like.

More specifically, a first preferred embodiment of an optical fiber splice connector containing the index of refraction matching gel of the invention is a butt splice connector for simultaneously aligning and clamping optical fibers. U.S. Pat. No. 4,834,197, which is herein incorporated by reference shows a butt splice connector for butt splicing two optical fibers, said element being formed from a thin sheet of deformable material having opposite surfaces and a pair of parallel grooves formed in one surface, two of the walls defining said grooves form a rib having equal converging sides and a first fiber supporting surface therebetween, the other two side walls forming the grooves are separated at their base portions from said two of the walls by land areas at which said sheet is folded, and said other two side walls extend from said land areas to said one surface of said sheet and include surface areas defining two additional fiber supporting surfaces which are disposed in an angular relationship to each other and with said first fiber supporting surface of said rib which surfaces collectively define an optical fiber passageway larger than the dimensions of a fiber when said sheet is folded to receive and align two opposed fiber ends at the axis of said passageway, and the sides of said sheet parallel to said grooves form legs which diverge from each other with the sheet folded and serve to draw the supporting surfaces toward one another upon movement of the edges of the legs toward one another to engage two said fiber ends and clamp them in axially aligned position. Also useful is a stamped precision lightguide interconnect centering element for use in butt splicing two optical fibers, said element being formed from a thin generally rectangular sheet of deformable metal having opposite surfaces and longitudinal edges, means defining three elongate optical fiber supporting surfaces including a generally centrally disposed surface and two side surfaces which are angularly positioned with respect to each other when said sheet is folded along opposite longitudinal edges of said centrally disposed surface, said supporting surfaces collectively define an optical fiber passageway larger than the dimensions of a fiber to receive and align two opposed fiber ends at the axis of said passageway, and the edges of said sheet parallel to said supporting surfaces form lever means supporting said two side surfaces for moving the supporting surfaces toward one another upon movement of the lever means toward one another to engage two said fiber ends and clamp them in axially aligned position, said metal having sufficient elastic yield strength against said fiber ends to embed said fiber ends into said fiber supporting surfaces.

The IMCs may also be used in a second exemplary embodiment disclosed in U.S. Pat. No. 4,856,865, which is also incorporated herein by reference. In this second exemplary connector embodiment there is shown a turnable fiber optic connector comprising a deformable housing; a V-groove block in said housing; and first and second ferrules inserted in said housing and lying in said V-groove such that when said housing is deformed in a predetermined manner by externally applied pressure said ferrules may be rotated and when said pressure is released, said ferrules are held in place, said ferrules having first and second diameters respectively, said first and second diameters being unequal, and each of said ferrules having a major axis and a bore for receiving and holding an optical fiber parallel to but offset from said major axis.

The IMCs may also be used in a third exemplary optical fiber connector of the type described in U.S. Pat. No. 4,729,619, the connector comprising:

(A) an elongate, resiliently deformable housing with a passageway therethrough;

(B) a first chock, secured within said passageway proximate to a first end of said housing and adapted to releasably secure at least a first optical fiber in cooperation with said housing; and (C) a second chock, secured within said passageway proximate to a second end of said housing and adapted to releasably secure at least a second optical fiber in cooperation with said housing;

whereby a connection of said optical fibers located within said passageway is isolated and stabilized from stresses external to said housing.

A more detailed use exemplifying a fourth embodiment would be as a splice element for use in splicing two abutting ends of optical fibers which generally having different diameters due to manufacturing tolerances as described in U.S. Pat. No. 5,013,123. The element of that patent is formed from ductile, deformable, elastic material and comprising means defining three generally planar fiber supporting surfaces, said three fiber supporting surfaces being disposed with each surface positioned at an acute angle to a second surface and defining an optical fiber passageway therebetween adapted for receiving two fiber ends to be spliced together, said passageway having a generally triangular cross-section, means for supporting at least one of said fiber supporting surfaces for movement in relationship to the other fiber supporting surfaces to draw said one of said supporting surfaces toward the other of said supporting surfaces and to apply sufficient force against two said fiber ends to force said fiber ends against said fiber supporting surfaces and to deform said material at said fiber supporting surfaces and embed a said fiber end of larger diameter uniformly in each said fiber supporting surface to a slightly different depth than the deformation from a said smaller diameter fiber end and deforming said fiber supporting surfaces for aligning the opposed fiber ends axially, and means for maintaining continued spring compression between said fiber supporting surfaces and said fiber ends for clamping said fiber ends in said element.

The IMCs may even be used in a fifth example of a connector for making reopenable butt splices for optical fibers. This fifth exemplary embodiment comprises a body member of a generally rectangular shape having a cavity in one surface and openings in its opposed ends communicating with said cavity, fiber splicing means disposed in said cavity having a fiber receiving passageway for centering and aligning the ends of two abutting fibers upon the restricting of said passageway and having two diverging members resiliently urged toward one another for restricting said passageway and clamping fibers therein, means disposing in said openings in the ends of said body member for retaining said fiber splicing means and for defining chamfered holes for guiding an end of a said optical fiber into said splicing means, and a cover having a top wall and depending cam bars on one surface thereof to receive said two diverging members of said fiber splicing means and urge the same toward each other, said cover being disposed with said bars in said cavity and said diverging members therebetween whereby movement of said cover into said body member to close said cavity will urge said diverging members against said optical fibers and align the opposed ends thereof in said passageway and retain said ends in aligned abutting relationship. The IMCs may also be used in a splice connector for making butt splices between two optical fibers comprising a base of having a bottom, top, opposed side walls and end walls, means for defining a cavity in said top wall and for defining aligned openings communicating with said cavity in said end walls, a splice element inserted in said cavity and comprising central rib means having a first elongate fiber supporting surface and a pair of level means pivoted about opposite edges of said rib means and diverging therefrom, said lever means each having an elongate fiber supporting surface positioned adjacent said first fiber supporting surface positioned adjacent said first fiber supporting surface to form a passageway for optical fibers and for engaging said fibers at spaced positions around said fiber, said level means being initially disposed to diverge from said rib means and being formed for movement toward each other to grasp said optical fibers therebetween and splice ends of two fibers in aligned position, and a cap having a top, and depending bar means on one surface of said top for receiving the diverging lever means of said element therebetween and for camming said lever means toward each other, said cap being disposed on said base with said bar means in said cavity and with said diverging levers of said element dispose therebetween whereby movement of said cap into said base to close said cavity will urge said lever means toward one another bringing said supporting surfaces against said optical fibers and align the ends thereof in the passageway and to retain said ends in aligned relationship.

Test Methods

Luminous transmission and haze measurements were made on an XL-211 Hazeguard™ System (Gardner/Neotec Instruments) in accordance with the procedure A of ASTM D1003. For the purpose of this invention the luminous transmission must be at least 90% as determined by ASTM D1003 when measured on a uniform 1 centimeter thick sample of the IMC. The haze must be less than 3% and luminous transmission equal or greater than 95% on a 254 micrometer thick sample as measured by the same method.

Refractive index measurements were made per ASTM D1218-87 on an Abbe Model A refractometer with temperature controlled prisms.

Viscosities were measured at 20° C. with a Brookfield viscometer using a T-A spindle at a rotational speed of 20 rpm.

EXAMPLES

EXAMPLE 1

Preparation of Anhydrous Hydrophobized Silica Organosol in 2-Propoxyethanol (Silica Organosol A)

A silica organosol was prepared by mixing 5.8 g phenyl triethoxysilane (Aldrich Co.), 1 g distilled water and 200 g Nalco 1057 silica sol (31.2% by weight silica solids in 2-propoxyethanol with an average silica particle size of 20 nanometers) in a round bottom flask. The mixed dispersion was heated to 80° C. for one hour, then filtered through a 0.5 micrometer filter (Millipore Corp.). The resulting water-clear sol had a viscosity of 3 cstk at 18° C. and was stable with no sign of gelation or silica precipitation over a period of six months. Over this period of six months it remained filterable through a 0.5 micrometer polypropylene filter, further confirming that the phenyl silane modified silica particles remained dispersed in the organic phase in a true sol state. The dry silica content of the organosol was determined gravimetrically to be 31.2%.

EXAMPLE 2

In a round bottom flask containing a magnetic stirrer, were mixed 11.5 g polypropylene glycol (Aldrich) of average molecular weight 2025 and 68.0 g silica organosol A. The flask was attached to a Rotavapor and the 2-propoxyethanol removed under 10mm Hg pressure at 85° C. The resulting gel was water-clear with a slight iridescence. Total silica content of the gel determined by pyrolysis of the organic phase at 600° C. was 68% by weight. The percent luminous transmission of a 1 cm thick sample measured in a parallel plate glass cell was 95%. The luminous transmission of a 254 micrometer thick film under the same condition was 99% with a haze value of 2%. The refractive indices of the gel and the neat polypropylene glycol fluid were determined as a function of temperature. In the case of the inventive IMC the equation for the refractive index ng was found by a least squares fit procedure [n=no+(dng/dT) T] to be:

$$n_g = 1.4587 - 2.3555 \times 10^{-4} T$$

where T is the temperature in degrees centigrade.

In the case of the neat polypropylene glycol, the equation for the refractive index determined by the same procedure was found to be:

$$n = 1.4577 - 3.4912 \times 10^{-4} T$$

The temperature coefficient of the refractive index has decreased in magnitude from a value of $-3.4912 \times 10^{-4}$/°C. for the neat polypropylene glycol to a value of $-2.3555 \times 10^{-4}$/°C. for the inventive IMC.

EXAMPLE 3

One part Nalco 1034A acidic silica sol (34% silica solids, pH 3.2, average particle size 20 nanometers) was mixed with 0.07 part glycidoxypropyltrimethoxysilane (Aldrich) and 0.17 part Pluracol™ E-400 polyether polyol (BASF) and the mixture subjected to vacuum distillation in a rotary evaporator at 85° C. to extract all the water. The resulting gel was water-clear, with a luminous transmission (1 cm thick sample) of 98% and a viscosity of $1.0 \times 10^3$ Pascal-second. The dng/dT of the prepared IMC was determined to be $-1.6931 \times 10^{-4}$/°C. as compared to $-3.1915 \times 10^{-4}$/°C. for the neat (i.e. silica free) Pluracol™ E-400 fluid.

EXAMPLE 4

A silica organosol containing 50% by weight silica was prepared by mixing 200 g of filtered silica organosol A and 62.4 g of PS782 silicone fluid (Huls-Petrarch Systems) in a one liter round bottom flask. The PS 782 silicone fluid being a vinyl terminated (83-85%) dimethyl (15-17%) diphenylsiloxane copolymer of nominal viscosity 0.5 Pascal-second and refractive index 1.465. The round bottom flask was attached to a Bucchi Rotavapor and the 2-propoxyethanol solvent completely removed at 75° C. under vacuum. The resulting IMC was transparent with a slight iridescence. Its viscosity at 20° C. was determined to be $5.6 \times 10^3$ Pascal-second. The percent luminous transmission of a 1 cm thick sample measured in a parallel plate glass cell was 95%. The luminous transmission of a 254 micrometer thick film under the same condition was 99% with a haze value of 2%. The refractive indices of the IMC and the neat silicone fluid were determined as a function of temperature. In the case of the inventive IMC the equation for the refractive index n was found to be:

$$n_g = 1.4703 - 2.4905 \times 10^{-4} T$$

where T is the temperature in degrees centigrade.

In the case of neat silicone fluid, the equation for the refractive index determined by the same procedure was found to be:
ti $n = 1.4722 - 3.5374 \times 10^{-4} T$ The temperature coefficient of the refractive index was reduced, as indicated in Table I, from a value of $-3.5374 \times 10^{-4}/°C$. for the neat silicone fluid to a value of $-2.4905 \times 10^{-4}/°C$. for the inventive IMC.

EXAMPLES 5-8

Amounts of silica organosol A and silicone fluid PS782 as indicated in Table I were mixed in round bottom flasks and subjected to exactly the same procedure as in Example 4 to prepare homogeneous, optically transmissive IMCs comprising respectively 40%, 30%, 20% and 10% by weight silica in the silicone matrix. The refractive index of each IMC as a function of temperature was measured over the temperature range 20°-80° C. and the slope $dn_g/dT$ determined for each composition. It is seen from Table I that the magnitude of $dn_g/dT$ decreases with increase in the silica content of the composition and that the effect becomes appreciable only at levels of silica exceeding 20% by weight.

TABLE I

| | organosol A (g) | PS782 (g) | SiO$_2$ % | Visc. Pa-sec. | $dn_g/dT \times 10^4$ L.T.* °C.$^{-1}$ % |
|---|---|---|---|---|---|
| PS782 | 0 | | 0 | 0.05 | -3.537410 |
| Example 4 | 200 | 65 | 50 | 99.1 | -2.490597 |
| Example 5 | 200 | 93.6 | 40 | 48.8 | -2.807297 |
| Example 6 | 200 | 146 | 30 | 10.8 | -3.146999 |
| Example 7 | 200 | 250 | 20 | 3.0 | -3.334699 |
| Example 8 | 200 | 562 | 10 | 1.8 | -3.558599 |
| Nyogel TM** | — | — | 10*** | $1.6 \times 10^3$ | -3.426199 |

*Percent luminous transmission of 1 cm thick sample.
**Nyogel TM OC-431 (W. F. Nye, Inc.).
***fume silica (Comparative Example 1).

EXAMPLE 9

A transparent crosslinkable sol containing 50% by weight silica was prepared by mixing silica organosol A into a tetrahydrofuran solution of ERL-4221 epoxy resin (available from Union Carbide). The ERL-4221 epoxy resin had a refractive index of 1.4975 at 25° C. and a $dn_g/dT$ of $-3.75 \times 10^{-4}/°C$., while the 50% silica epoxy sol had a refractive index of 1.4855 at 25° C. and a $dn_g/dT$ of $-2.59 \times 10^{-4}/°C$. A photocatalyst (6.5 milligrams of cyclopentadienyliron (II) xylenes hexafluoroantimonate complex $\{[CpFeXyl]^+SbF^-_6)°\}$) was dissolved in 2.64 grams of silica-epoxy sol under dark conditions by slight warming the admixture to approximately 35°-45° C. The $[CpFeXyl]^+.SbF_6^-$ photocatalyst was prepared using the method described in U.S. Pat. No. 5,059,701.

Several drops of the photocatalyzed silica-epoxy sol was place between the two microscope slides and irradiated for 2 minutes using an Efos UV light gun available from National Engineered Fiber Optic Systems, Inc., Williamsville, N.Y. 14221. The adhered slide assembly was further cured at 50° C. for 45 minutes which produced a bond deemed satisfactory for assembly of optical elements.

Comparative Example 1

Nyogel TM OC-431 is an index matching gel for fiber optic connectors marketed by W. F. Nye, Inc. (New Bedford, Mass.). The IMC consists of 90% by weight silicone fluid and 10% fume silica thickener. At 20° C. the viscosity of the gel is $1.6 \times 10^3$ Pascal-second, well above the viscosity of the inventive IMCs described in Examples 5-9 or Examples 2-3. It is also seen from Table I that $dn_g/dT$ for the state of the art Nyogel TM OC-431A is virtually indistinguishable from $dn_g/dT$ of the pure silicone oil PS782.

Comparative Example 2

A reinforcing silica gel was prepared as in Example 1 of U.S. Pat. No. 4,418,165 by mixing 410 ml methanol, 75.4 ml concentrated aqueous ammonium hydroxide (28.4% ammonia content) and 30.8 ml distilled water in a bottle containing a magnetic stirring bar. Then 60 ml of hexamethyldisilazane was added and the mixture allowed to stir an additional 10 minutes before 120 ml of methyl orthosilicate was rapidly added. The mixture was then allowed to stir at room temperature until it gelled and the magnetic stirring bar stopped. The gelled silica filler composition was allowed to age for three hours after addition of the methyl orthosilicate before it was added to 50 g PS782 silicone oil (the silicone gum used in Example 1 of U.S. Pat. No. 4,418,165 had too low an index of refraction (1.42) and too high a viscosity to be a meaningful candidate). The mixture was then placed in a heated two-roll mill at 105° C. for 30 minutes. A rigid, brittle, nearly opaque sheet was obtained. The luminous transmission of a 1 cm thick sample of the sheet was less than 10%.

No improvement in the viscosity or luminous transmission were observed when the 60 ml of hexamethyldisilazane in the above composition were replaced with 30 or 60 ml phenyltrimethoxysilane hydrophobizing agent.

It is desired to claim:

1. An optical system comprising:
   a. a first and second optical element,
   b. means for constraining said elements in a predetermined spatial arrangement, and
   c. an index matching composition, said composition comprising a gel having a $dn_g/dT$ which is smaller in magnitude than $3.5 \times 10^{-4}/°C$.,
   wherein, at least one of said elements is coated with a layer of said composition and joined to the other of said elements in said predetermined spatial arrangement.

2. The system of claim 1, wherein said elements are optical fibers.

3. The system of claim 1, wherein said elements are waveguides.

4. The system of claim 1, wherein said elements are optical fibers and optical waveguides.

5. The system of claim 1, wherein said composition has a $dn_g/dT$ which is smaller in magnitude than $3.0 \times 10^{-4}/°C$.

6. The system of claim 1, wherein said index matching composition is an optically transmissive composition comprising:
   i. 20 to 80 parts by weight individually dispersed silica sol particles, and
   ii. 80 to 20 parts by weight of a liquid polymer having a refractive index between 1.44-1.52.

7. The system of claim 1, wherein said composition further includes a surface modifying agent.

8. The system of claim 7, wherein said surface modifying agent is present in an amount which is sufficient to provide monolayer coverage of at least 75% of the surface area for each of said silica sol particles.

9. The system of claim 7, wherein said surface modifying agent is selected from the group consisting of organosilanes, carboxylatochromium complexes, carboxylic acids, organotitanates, and organozirconates.

10. The system of claim 6, wherein said liquid polymer is selected from the group consisting of polymers and copolymers comprising the polyether polyols and end-substituted polyether polyols, silicone polymers and copolymers, and siloxane-alkene oxide block copolymers.

11. The system of claim 1, wherein said liquid polymer comprises polyether polyol and said surface modifying agent comprises glycidoxypropyltrimethoxysilane.

12. A splice connector for making butt splices between two optical fibers, wherein the improvement comprises interposing an index matching composition between said fiber ends, said composition comprising a gel having a $dn_g/dT$ which is smaller in magnitude than $3.5 \times 10^{-4}/°C$.

13. The splice connector of claim 12, wherein said index matching composition is an optically transmissive composition comprising:
   i. 20 to 80 parts by weight individually dispersed silica sol particles, and
   ii. 80 to 20 parts by weight of a liquid polymer having a refractive index between 1.44-1.52.

14. The splice connector of claim 12, wherein said composition has a $dn_g/dT$ which is smaller in magnitude than $3.0 \times 10^{-4}/°C$.

15. The splice connector of claim 12, wherein said composition further includes a surface modifying agent.

16. The splice connector of claim 15, wherein said surface modifying agent is present in an amount which is sufficient to provide monolayer coverage of at least 75% of the surface area for each of said silica sol particles.

17. The splice connector of claim 15, wherein said surface modifying agent is selected from the group consisting of organosilanes, carboxylatochromium complexes, carboxylic acids, organotitanates, and organozirconates.

18. The splice connector of claim 13, wherein said liquid polymer is selected from the group consisting of polymers and copolymers comprising the polyether polyols and end-substituted polyether polyols, silicone polymers and copolymers, and siloxane-alkene oxide block copolymers.

19. A splice element for use in splicing two abutting ends of optical fibers, wherein the improvement comprises interposing an index matching composition between said fiber ends, said composition comprising a gel having a $dn_g/dT$ which is smaller in magnitude than $3.5 \times 10^{-4}/°C$.

20. The splice element of claim 19, wherein said index matching composition is an optically transmissive composition comprising:
   i. 20 to 80 parts by weight individually dispersed silica sol particles, and
   ii. 80 to 20 parts by weight of a liquid polymer having a refractive index between 1.44-1.52.

21. The splice element of claim 19, wherein said composition has a $dn_g/dT$ which is smaller in magnitude than $3.0 \times 10^{-4}/°C$.

22. The splice element of claim 19, wherein said composition further includes a surface modifying agent.

23. The splice element of claim 22, wherein said surface modifying agent is present in an amount which is sufficient to provide monolayer coverage of at least 75% of the surface area for each of said silica sol particles.

24. The splice element of claim 22, wherein said surface modifying agent is selected from the group consisting of organosilanes, carboxylatochromium complexes, carboxylic acids, organotitanates, and organozirconates.

25. The splice element of claim 20, wherein said liquid polymer is selected from the group consisting of polymers and copolymers comprising the polyether polyols and end-substituted polyether polyols, silicone polymers and copolymers, and siloxane-alkene oxide block copolymers.

26. An optical fiber connector for securing at least one optical fiber within said connector, wherein the improvement comprises coating said at least one optical fiber with a layer of an index matching composition, said composition comprising a gel having a $dn_g/dT$ which is smaller in magnitude than $3.5 \times 10^{-4}/°C$.

27. The connector of claim 26, wherein said composition has a $dn_g/dT$ which is smaller in magnitude than $3.0 \times 10^{-4}/°C$.

28. The connector of claim 26, wherein said composition further includes a surface modifying agent.

29. The connector of claim 28, wherein said surface modifying agent is present in an amount which is sufficient to provide monolayer coverage of at least 75% of the surface area for each of said silica sol particles.

30. The connector of claim 28, wherein said surface modifying agent is selected from the group consisting of organosilanes, carboxylatochromium complexes, carboxylic acids, organotitanates, and organozirconates.

31. The connector of claim 26, wherein said index matching composition is an optically transmissive composition comprising:
   i. 20 to 80 parts by weight individually dispersed silica sol particles, and
   ii. 80 to 20 parts by weight of a liquid polymer having a refractive index between 1.44-1.52.

32. The connector of claim 31, wherein said liquid polymer is selected from the group consisting of polymers and copolymers comprising the polyether polyols and end-substituted polyether polyols, silicone polymers and copolymers, and siloxane-alkene oxide block copolymers.

* * * * *

UNITED STATES PATENT AND TRADEMARK OFFICE
CERTIFICATE OF CORRECTION

PATENT NO. : 5,307,438
DATED : April 26, 1994
INVENTOR(S) : Zayn Bilkadi, Marc D. Radcliffe, and James C. Novack It is certified that error appears in the above-indentified patent and that said Letters Patent is hereby corrected as shown below:

On the face of the patent the name of inventor Novack should be changed to read James C. Novack, and not "Novack James C.".

Col. 14, line 67, remove "ti" before equation.

Signed and Sealed this

Seventeenth Day of January, 1995

Attest:

BRUCE LEHMAN

*Attesting Officer*  *Commissioner of Patents and Trademarks*